United States Patent
Chu et al.

(10) Patent No.: US 7,411,941 B2
(45) Date of Patent: Aug. 12, 2008

(54) TEXT TELEPHONE MODEM COMMUNICATIONS OVER PACKET NETWORKS

(75) Inventors: Keith T. Chu, Mission Viejo, CA (US); Jason B. Brent, Foothill Ranch, CA (US)

(73) Assignee: Mindspeed Technologies, Inc., Newport Beach, CA (US)

( * ) Notice: Subject to any disclaimer, the term of this patent is extended or adjusted under 35 U.S.C. 154(b) by 526 days.

(21) Appl. No.: 11/036,627

(22) Filed: Jan. 13, 2005

(65) Prior Publication Data

US 2005/0195801 A1    Sep. 8, 2005

Related U.S. Application Data

(60) Provisional application No. 60/549,303, filed on Mar. 2, 2004.

(51) Int. Cl.
*H04L 12/28* (2006.01)
(52) U.S. Cl. .............. 370/352; 370/401; 375/222; 379/52; 379/93.01; 379/93.08
(58) Field of Classification Search ............. 370/255, 370/328, 352, 401, 509, 516; 375/222; 701/11, 701/1; 709/200; 379/52, 90.1, 93.01, 93.08
See application file for complete search history.

(56) References Cited

U.S. PATENT DOCUMENTS 6,788,651 B1 * 9/2004 Brent et al. ............ 370/255
7,162,012 B2 * 1/2007 Freundlich et al. ............ 379/52
2002/0064168 A1   5/2002 Garakani
2002/0176401 A1 * 11/2002 Ryan et al. ................. 370/352
2003/0093187 A1 * 5/2003 Walker ......................... 701/1
2003/0137952 A1 * 7/2003 Menon ....................... 370/328
2003/0206559 A1 * 11/2003 Trachewsky et al. ........ 370/509
2004/0228325 A1 * 11/2004 Hepworth et al. ........... 370/352

FOREIGN PATENT DOCUMENTS

| EP | 0929173 | 7/1999 |
| EP | 1 388 998 | 2/2004 |
| JP | 59086945 | 5/1984 |
| WO | WO 02089440 | 11/2002 |
| WO | WO 02098081 | 12/2002 |

* cited by examiner

*Primary Examiner*—Chi H. Pham
*Assistant Examiner*—Albert T Chou
(74) *Attorney, Agent, or Firm*—Farjami & Farjami LLP

(57) ABSTRACT

A modem detection method is provided for use by a first gateway, the first gateway capable of communicating with a second gateway over a packet network. The method comprises setting the first gateway to a voice mode having a first coding scheme, encoding an input signal using the first coding scheme to generate a first encoded input signal, transmitting the first encoded input signal to the second gateway over the packet network, looking for a first tone in the input signal while the first gateway is in the voice mode, wherein the first tone is indicative of a beginning of a character, detecting the first tone in the input signal; setting the first gateway from the voice mode to a modem mode in response to the detecting; and transmitting the input signal to the second gateway according to the modem mode.

16 Claims, 7 Drawing Sheets

300

| Binary | Decimal | Hex | Octal | Letter | Figure |
|--------|---------|-----|-------|--------|--------|
| 00000 | 0 | 0 | 0 | Blank | Blank |
| 00001 | 1 | 1 | 1 | T | 5 |
| 00010 | 2 | 2 | 2 | CR | CR |
| 00011 | 3 | 3 | 3 | O | 9 |
| 00100 | 4 | 4 | 4 | Space | Space |
| 00101 | 5 | 5 | 5 | H | |
| 00110 | 6 | 6 | 6 | N | , |
| 00111 | 7 | 7 | 7 | M | . |
| 01000 | 8 | 8 | 10 | Line Feed | Line Feed |
| 01001 | 9 | 9 | 11 | L | ) |
| 01010 | 10 | A | 12 | R | 4 |
| 01011 | 11 | B | 13 | G | & |
| 01100 | 12 | C | 14 | I | 8 |
| 01101 | 13 | D | 15 | P | 0 |
| 01110 | 14 | E | 16 | C | : |
| 01111 | 15 | F | 17 | V | ; |
| 10000 | 16 | 10 | 20 | E | 3 |
| 10001 | 17 | 11 | 21 | Z | " |
| 10010 | 18 | 12 | 22 | D | $ |
| 10011 | 19 | 13 | 23 | B | ? |
| 10100 | 20 | 14 | 24 | S | BEL |
| 10101 | 21 | 15 | 25 | Y | 6 |
| 10110 | 22 | 16 | 26 | F | ! |
| 10111 | 23 | 17 | 27 | X | / |
| 11000 | 24 | 18 | 30 | A | - |
| 11001 | 25 | 19 | 31 | W | 2 |
| 11010 | 26 | 1A | 32 | J | ' |
| 11011 | 27 | 1B | 33 | Figure Shift | |
| 11100 | 28 | 1C | 34 | U | 7 |
| 11101 | 29 | 1D | 35 | Q | 1 |
| 11110 | 30 | 1E | 36 | K | ( |
| 11111 | 31 | 1F | 37 | Letter Shift | |

FIG. 3

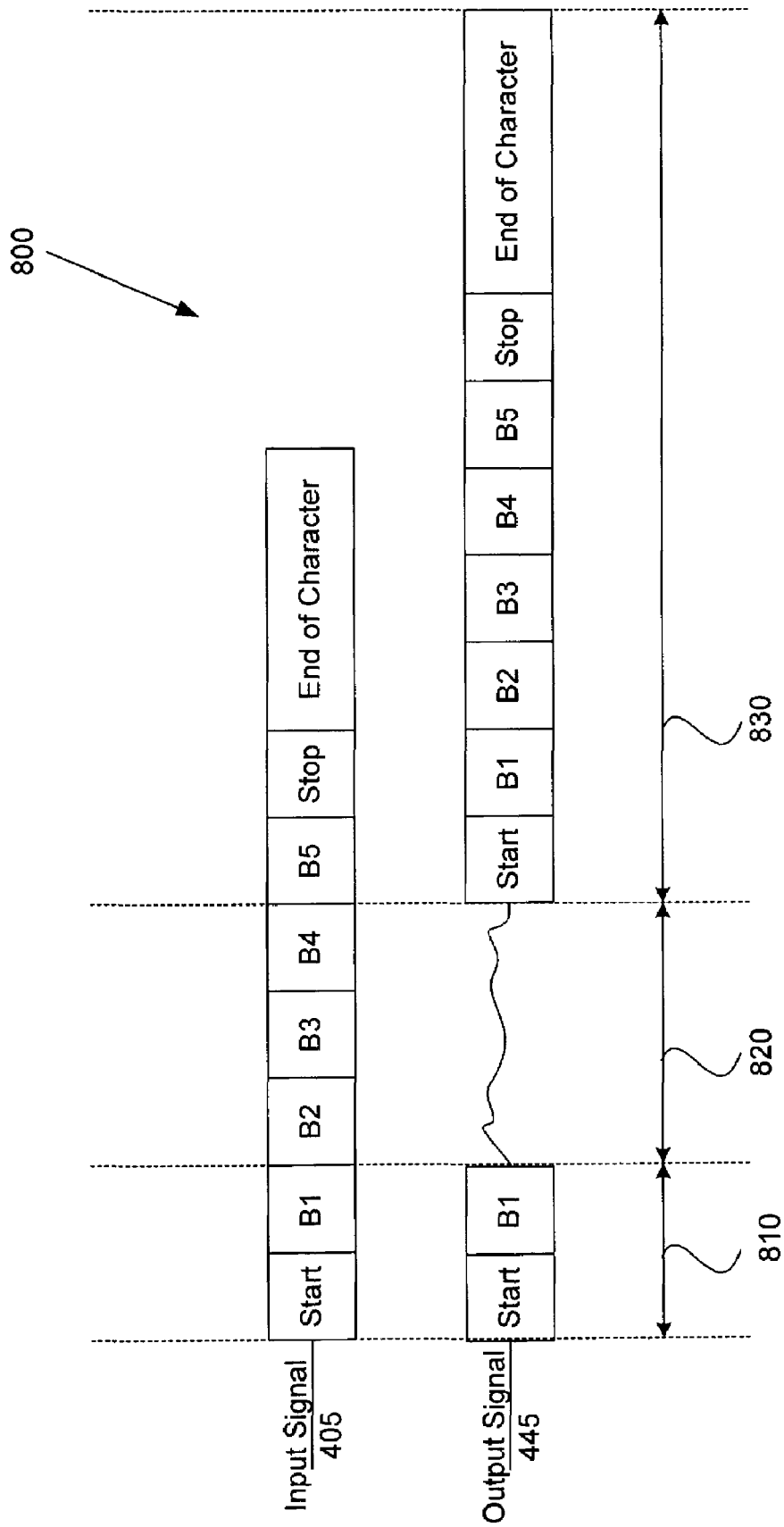

TEXT TELEPHONE MODEM COMMUNICATIONS OVER PACKET NETWORKS

RELATED APPLICATIONS

The present application is based on and claims priority to U.S. Provisional Application Ser. No. 60/549,303, filed Mar. 2, 2004, which is hereby incorporated by reference in its entirety.

BACKGROUND OF THE INVENTION

1. Field of the Invention

The present invention generally relates to communications over packet networks and, more particularly, to supporting text telephone modem communications over packet networks.

2. Background Art

Today, the traditional analog telephony is being rapidly replaced with digital IP (Internet Protocol) telephony, which uses various techniques to break voice into data packets for transmission over packet networks. Analog modems have been utilized to provide data, facsimile, voice and text communications over twisted pair telephone lines for decades. Because a significant infrastructure is in place using such modems, the packet networks need to address and support modem communications.

One type of modem that has been in use for many years is the Text Telephone (TTY) modem, which can be used in an analog text telephone. Due to the recent move to the packet network environment, TTY modems have created a unique challenge for support over the packet networks. TTY modems, are also sometimes referred to as a TDD (Telecommunication Device for the Deaf) modems, which are special devices that allow deaf, hard of hearing, or speech-impaired people to use the telephone to communicate. Telephone communication for such users is accomplished by allowing them to type messages back and forth to one another instead of talking and listening. A TTY modem is required at both ends of the conversation in order to establish a telephone communication. However, TTY modems do not use the same communication protocol as regular data modems and, thus, TTY modems require the packet network gateways to perform a different detection algorithm for detecting TTY modems in order to configure the gateways properly. There are several different TTY modems, such as Baudot @ 45.45 baud (U.S. TTYs); Baudot @ 50 baud (international Baudot used in Australia, England, and other countries); V.21/text telephone version (Sweden, Norway, and Finland); DTMF (Denmark, Holland, other countries); and EDT ("European Deaf Telephone") (Germany, Austria, Switzerland, and other countries).

FIG. 1 illustrates a block diagram of a conventional communications network 100 utilizing TTY modems for communication over a packet network protocol, such as Internet Protocol, which may also be referred to as Text over Internet Protocol ("ToIP"). As shown, communications network 100 includes first text telephone modem (TTY1) 102 in communication with first gateway device (G1) 104 over first phone line 108, and second gateway device (G2) 114 in communication with second text telephone modem (TTY2) 122 over second phone line 118. Communications network 100 further includes a packet network protocol, such as IP 112 to provide communications between first gateway device 104 and second gateway device 114. IP 112 implements the network layer (layer 3) of a network protocol, which contains a network address and is used to route a message to a different network or subnetwork. IP 112 accepts packets from the layer 4 transport protocol, such as Transmission Control Protocol ("TCP") or User Data Protocol ("UDP"), and adds its own header and delivers the data to the layer 2 data link protocol. TCP provides transport functions, which ensures that the total amount of bytes sent is received correctly at the other end. UDP, which is part of the TCP/IP suite, is an alternate transport that does not guarantee delivery. UDP is widely used for real-time voice and video transmissions where erroneous packets are not retransmitted.

The communication process begins when TTY1 102 originates a call to TTY2 122. G1 104 receives the call and informs G2 114 of the call for TTY2 122 over communications network 100 and, as a result, G2 114 calls TTY2 122. Typically, in the default mode of operation, G1 104 and G2 114 communicate in voice mode and use compressed voice protocol, such as the ITU standard G.723.1. Conventionally, G1 104 and G2 114 detect modem communications to switch to an uncompressed voice protocol, such as an ITU standard G.711, which provides toll quality audio at 64 Kbps using either A-Law or mu-Law pulse code modulation methods. This uncompressed digital format is used in order to allow easy connections to legacy telephone networks. By switching to G.711, the signals generated by TTY1 102 may propagate through from G1 104 to G2 114 in a more intact manner in order to reach TTY2 122, since an uncompressed format conventionally matches the format used on phone lines 108 and 118, such that signal sample values output from G2 114 from phone line 118 would generally be identical to the corresponding sample values input to G1 104 from phone line 108, thus allowing for the propagation delay through G1 104, IP 112 and G2 114, which is conventionally known as the pass-through mode for modems.

The predominant text telephony modulation schemes use carrier-less modulation. For example, in the U.S., each key depression on the text telephone causes the transmission of a complete Baudot character, including start and stop bits. FIG. 2 illustrates a manual transmission of the text "GA" by typing on the text telephone, which is followed by a "new line" character. As shown, The "G" and "A" characters are spaced apart in time at the rate at which they are typed. The "new line" character is broken into two characters, namely "carriage return" and "line feed". Therefore, there is no indication prior to receiving the first character, i.e. "A", by G1 104 from TTY1 102 that the signal is a text telephone signal.

The proper detection of TTY modems in a timely fashion is crucial for switching from one mode of operation by G1 104 and G2 114 to another modem of operation in order to support communications between TTY modems over the packet network. Today, a major implementation issue for ToIP is the potential for either losing or repeating the first character of a TTY modem communication, which is considered regression in functionality vis-à-vis communications over the PSTN (Public Switch Telephone Network). Furthermore, in applications such as PSAPs (Public Safety Answering Points) or emergency services, where reliability is paramount, losing or repeating a character is not a mere inconvenience, but can be life threatening. As a further example, if the first character is part of a password or a user identification, user's login may fail if the first character is lost or repeated due to improper or untimely switching from one mode of operation to another by the gateways.

Accordingly, there is an intense need in the art for a proper detection of TTY modems and timely switching by the gateways to support TTY modem communications over packet networks.

SUMMARY OF THE INVENTION

The present invention is directed to proper and timely detection of a modem by a gateway in a packet network environment and switching to support modem communications. In one aspect of the present invention, there is provided a modem detection method for use by a first gateway, where the first gateway is capable of communicating with a second gateway over a packet network. The modem detection method comprises setting the first gateway to a voice mode having a first coding scheme; encoding an input signal using the first coding scheme to generate a first encoded input signal, while the first gateway is in the voice mode; transmitting the first encoded input signal to the second gateway over the packet network, while the first gateway is in the voice mode; looking for a first tone in the input signal while the first gateway is in the voice mode, wherein the first tone is indicative of a beginning of a character; detecting the first tone in the input signal while performing the looking; setting the first gateway from the voice mode to a modem mode in response to the detecting; and transmitting the input signal to the second gateway over the packet network according to the modem mode.

In a further aspect, the modem mode has a second encoding scheme, and the modem detection method further comprises encoding the input signal using the second coding scheme to generate a second encoded input signal, while the first gateway is in the modem mode; and transmitting the second encoded input signal to the second gateway over the packet network, while the first gateway is in the modem mode. The modem detection method may also comprise delaying the input signal in a delay line for a pre-determine period of time to create a delayed input signal while the first gateway is in the voice mode; transmitting the delayed input signal to the second gateway over the packet network according to the modem mode, prior to the transmitting the input signal to the second gateway over the packet network according to the modem mode. In one aspect, the delay line can be less than a character bit time and, in another aspect, the delay line can be less than one half of a character bit time. Furthermore, a silence period can be included between the first encoded input signal transmitted over the packet network while the first gateway is in the voice mode and the second encoded input signal transmitted over the packet work while the first gateway is in the modem mode.

In a further aspect, the modem mode has a modem demodulator, and the modem detection method comprises demodulating the input signal using the modem demodulator to generate a demodulated input signal, while the first gateway is in the modem mode; and transmitting the demodulated input signal to the second gateway over the packet network, while the first gateway is in the modem mode.

In an additional aspect, the modem detection method comprises verifying the input signal is a modem signal after the setting the first gateway to the modem mode; and switching the first gateway to the voice mode if the verifying fails.

In yet another aspect, the looking operation of the modem detection method looks for the first tone and one or more additional tones in the input signal while the first gateway is in the voice mode, wherein each of the one or more additional tones is indicative of the beginning of the character, and wherein the detecting detects the first tone or the one or more tones in the input signal while performing the looking.

In a further aspect, the method further comprises performing a fast tone detection for detecting the first tone in the input signal; and filtering the input signal prior to the encoding if the fast tone detection detects the first tone, where a notch filter can be used for filtering the input signal. In one aspect, the filtering filters the first tone from the input signal. In another aspect, filtering filters one or more of modem tones from the input signal.

In a separate aspect, there is also provided a first gateway capable of detecting a modem, the first gateway having a voice mode and a modem mode, the first gateway being capable of communicating with a second gateway over a packet network. The first gateway comprises an encoder configured to encode an input signal using a first coding scheme to generate a first encoded input signal, while the first gateway is in the voice mode; a transmitter configured to transmit the first encoded input signal to the second gateway over the packet network, while the first gateway is in the voice mode; a detector configured to look for a first tone in the input signal while the first gateway is in the voice mode, wherein the first tone is indicative of a beginning of a character; wherein the detector detects the first tone in the input signal while looking for the first tone, wherein the first gateway is configured from the voice mode to the modem mode in response to detecting the first tone, and wherein the transmitter is configured to transmit the input signal to the second gateway over the packet network according to the modem mode.

In a further aspect, the first gateway further comprises a fast tone detection is configured to receive and detect the first tone in the input signal; and a filter is configured to filter the input signal prior to the encoder receives input signal if the fast tone detection detects the first tone, where the filter can be a notch filter. In one aspect, the filter filters the first tone from the input signal. In another aspect, the filter filters one or more of modem tones from the input signal.

In a separate aspect, a modem detection method for use by a first gateway is provided, where the first gateway is capable of communicating with a second gateway over a packet network. The method comprises setting the first gateway to a voice mode having a first coding scheme; encoding an input signal using the first coding scheme to generate a first encoded input signal, while the first gateway is in the voice mode; transmitting the first encoded input signal to the second gateway over the packet network, while the first gateway is in the voice mode; detecting first one or more bits of a beginning of a character in the input signal, using a fast tone detector, while the first gateway is in the voice mode; preventing, in response to the detecting, at least a portion of the input signal from being transmitted to the second gateway; confirming second one or more bits of the beginning of the character in the input signal, using a main tone detector, while the first gateway is in the voice mode, wherein the second one or more bits include more bits than the first one or more bits and include the first one or more bits; setting the first gateway from the voice mode to a modem mode in response to the confirming; and transmitting the input signal to the second gateway over the packet network according to the modem mode.

In one aspect, a notch filter filters out one or more tones from the input signal prior to the encoding. In another aspect, the method prevents any portion of the input signal from being transmitted to the second gateway.

In yet another aspect, the modem mode has a second encoding scheme, and the method further comprises encoding the input signal using the second coding scheme to generate a second encoded input signal, while the first gateway is in the modem mode; and transmitting the second encoded input signal to the second gateway over the packet network, while the first gateway is in the modem mode. In a further aspect, the method further comprises delaying the input signal in a delay line for a pre-determine period of time to generate a delayed input signal while the first gateway is in the voice mode; transmitting the delayed input signal to the second gateway over the packet network according to the modem mode, prior to the transmitting the input signal to the second gateway over the packet network according to the modem mode. In one aspect, the delay line is less than a character time. In another aspect, the fast tone detector detects one or more tones in the input signal while the first gateway is in the voice mode.

In a further aspect, the modem mode has a modem demodulator, and the method further comprises demodulating the input signal using the modem demodulator to generate a demodulated input signal, while the first gateway is in the modem mode; and transmitting the demodulated input signal to the second gateway over the packet network, while the first gateway is in the modem mode.

Other features and advantages of the present invention will become more readily apparent to those of ordinary skill in the art after reviewing the following detailed description and accompanying drawings.

BRIEF DESCRIPTION OF THE DRAWINGS

The features and advantages of the present invention will become more readily apparent to those ordinarily skilled in the art after reviewing the following detailed description and accompanying drawings, wherein:

FIG. 3 illustrates a list of Baudot codes;

FIG. 8 illustrates a TTY modem signal transmission using the operation flow diagram of FIG. 7.

DETAILED DESCRIPTION OF THE INVENTION

Figure 1:
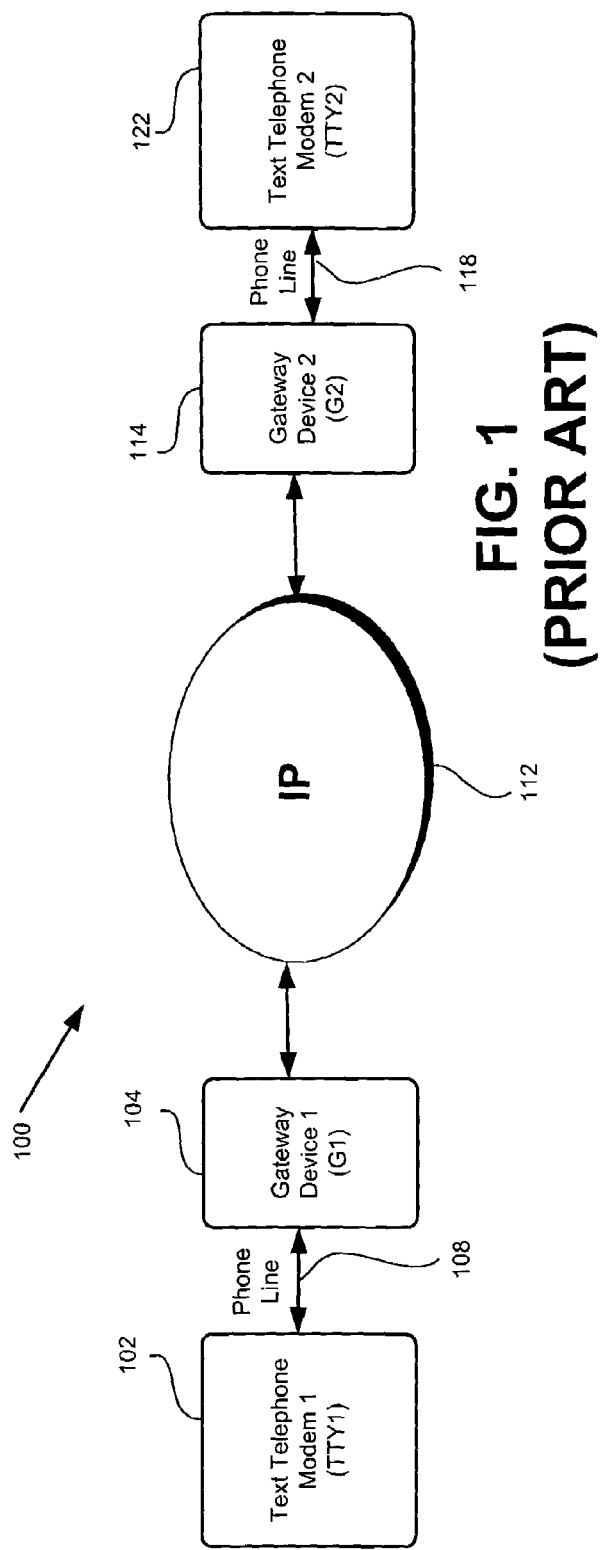
FIG. 1 illustrates a block diagram of a conventional communications network utilizing TTY modems for communication over a packet network.
Figure 2:
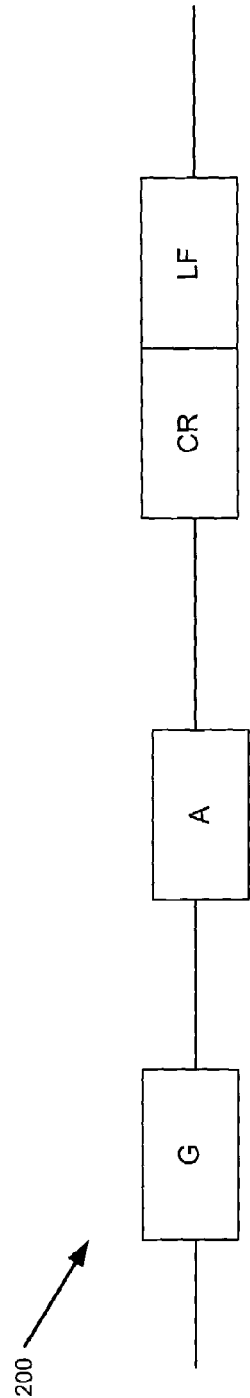
FIG. 2 illustrates a manual transmission of an example text using TTY modems.

The present invention is directed to text telephone modem communications over packet networks. Although the invention is described with respect to specific embodiments, the principles of the invention, as defined by the claims appended herein, can obviously be applied beyond the specifically described embodiments of the invention described herein. For example, although the invention is described with reference to TIA-825A ("Baudot") or U.S. TTY modem protocol for the ease of understanding, the invention is not limited to such protocol and can be used for detection of other modems, such as fax modems, point of sale modems, etc. Moreover, in the description of the present invention, certain details have been left out in order to not obscure the inventive aspects of the invention. The details left out are within the knowledge of a person of ordinary skill in the art.

The drawings in the present application and their accompanying detailed description are directed to merely example embodiments of the invention. To maintain brevity, other embodiments of the invention which use the principles of the present invention are not specifically described in the present application and are not specifically illustrated by the present drawings. It should be borne in mind that, unless noted otherwise, like or corresponding elements among the figures may be indicated by like or corresponding reference numerals.

The dominant text telephony standard in the U.S. is described in TIA-825-A, titled "A Frequency Shift Keyed Modem for Use on the Public Switched Telephone Network", published Apr. 22, 2003, by Telecommunication Industry Association (TIA), which is hereby incorporated by reference in its entirety. TIA-825-A describes an FSK (Frequency Shift Keyed) modem, which operates at nominal data signaling rates of 50 or 45.45 bits per second (or bps) over the PSTN. TTY modems, in the U.S., transmit characters using 45.45 bps Baudot codes shown in FIG. 3. Each bit has a nominal duration of 22+/−0.4 ms, and each character consists of one (1) start bit, five (5) data bits and one to two (1-2) stop bits. Baudot codes use a carrierless and binary FSK signaling scheme. A mark or "1" is transmitted with a 1400 Hz tone, and a space or "0" is transmitted with an 1800 Hz tone. "Carrierless" means that no FSK signal tones are transmitted after all characters have been completely sent.

Typically, the first tone of a TTY modem character is a space tone or 1800 Hz tone representing the start bit. Recently, the ITU-T V.18 Recommendation has described the transmission of an optional mark hold tone for 150 ms prior to the transmission of the start bit. Furthermore, a mark hold tone is transmitted at the end of the character, which extends the length of time the stop bit is transmitted from 150 ms to 300 ms; however, the mark hold tone is not transmitted if the character is immediately followed by another character. The mark hold tone is transmitted to prevent the transmitting device from receiving its echo and mistaking it for an incoming character.

Figure 4:
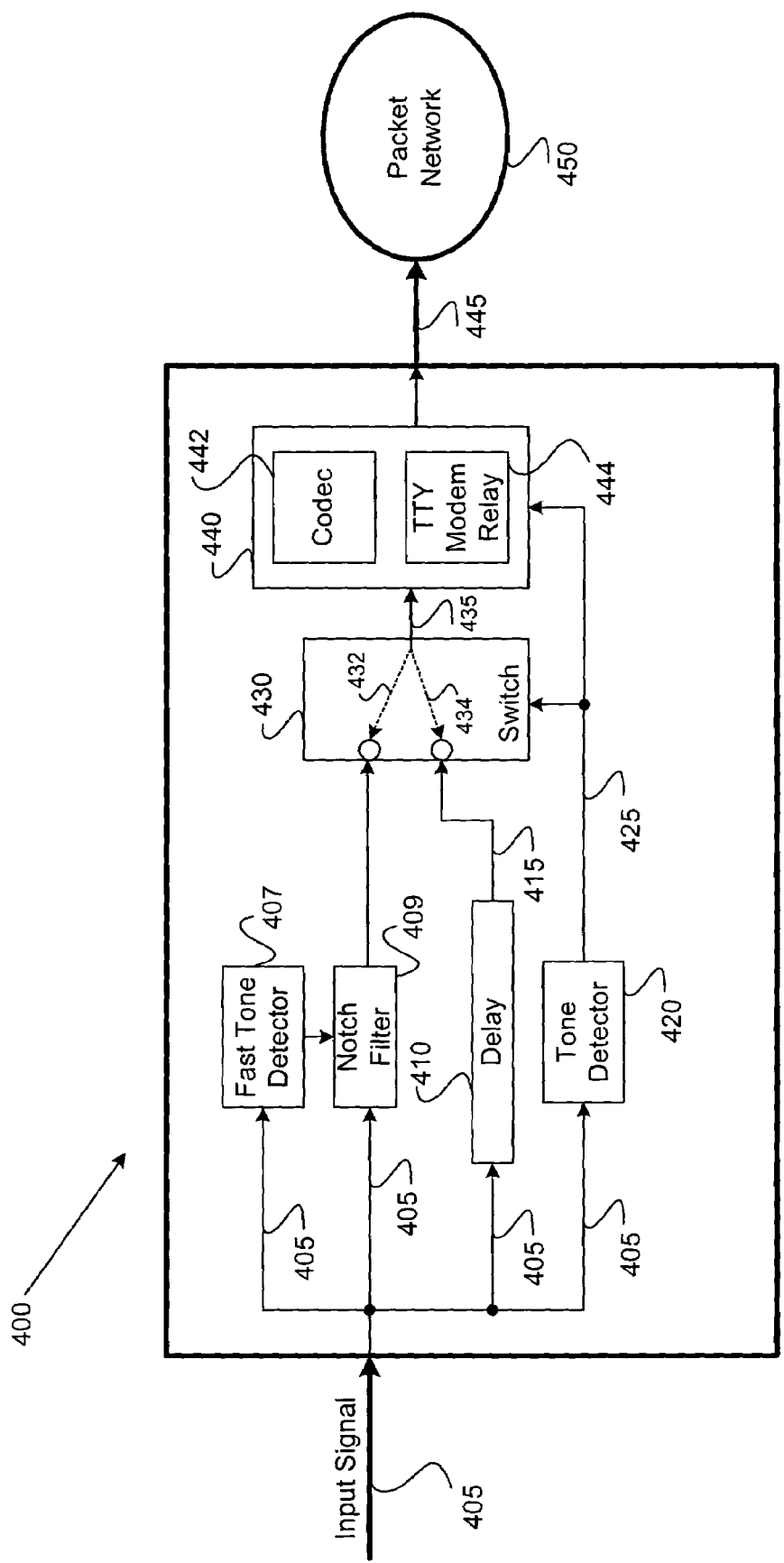
FIG. 4 illustrates a TTY modem detection system, in accordance with one embodiment of the present invention.

Referring to FIG. 4, it illustrates TTY modem detection system 400, in accordance with one embodiment of the present invention. TTY modem detection system 400 can be implemented in a gateway, such as G1 104 or G1 114 of FIG. 1, for proper and timely detection of TTY modem transmissions. As stated above, proper and timely detection of TTY modem transmissions and unobtrusive switching from voice mode to a TTY modem mode are crucial to ensure that the first character of a TTY modem transmission is not repeated or lost. As shown, TTY modem detection system 400 receives input signal 405, which may be presented in G.711 PCM (Pulse Code Modulation) encoded format originated in the PSTN.

Input signal 405 is provided to switch 430, delay 410 and tone detector 420. TTY modem detection system 400 also includes signal processing 440, which includes codec 442, and in some embodiment, signal processing 440 may also include TTY modem relay 444. As stated above, G1 104 and G2 114, in their default of mode of operation, are typically set up in voice mode. For example, initially, TTY modem detection system 400 has voice mode switch 432 selected, such that input signal 405 is transmitted through switch 430 to signal processing 440, which has codec 440 selected in a compressed voice coder mode, such as G.723.1 or G.729. In the voice mode of operation, signal processing 440 uses codec 442 to compress input signal 435 to generate output signal 445 for transmission over packet network 450.

As shown in FIG. 4, delay 410 and tone detector 420 of TTY modem detection system 400 also receive input signal 405. Delay 410 can be a simple linear delay line of PCM samples. In one embodiment, a delay size may be equal to an amount of time needed for proper detection of the start bit frequency, e.g. 1800 Hz, plus an amount of time needed for switch 430 and signal processing 440 to switch to a new mode of operation. For example, in one embodiment, delay 410 has a delay size of 20% to 25% of the start bit time, e.g. 4.4 ms to 5.5 ms. Yet, in another embodiment, delay 410 has a delay size of around 50% of the start bit time, e.g. 11 ms. In another embodiment, delay 410 has a delay size up to 100% of one character time.

Tone detector 420 is configured to detect a sufficient portion of the start bit frequency of the first character of TTY modem transmission. In one embodiment, tone detector 420 may detect 20% to 25% of the start bit frequency, e.g. 4.4 ms to 5.5 ms of 1800 Hz space tone. Yet, in another embodiment, tone detector 420 may detect around 50% of the start bit frequency, e.g. 11 ms of 1800 Hz space tone. Tone detector 420 may be one of a variety tone detectors, such as phase lock loop, bandpass filter with integrate and dump, cross-correlators, or other tone detectors known in the art.

In some embodiments, tone detectors 420 may detect both mark and space frequencies to robustly detect several bits up to one character duration. Such longer detection time for switching from voice mode to TTY modem mode may be desirable in order to reduce the rate of false detection and, thus, reduce the rate of false switching from voice mode to TTY modem mode. However, by extending the detection time to provide a robust detection, more pre-detection TTY signal may be leaked through to the remote TTY modem, and such pre-detection leakage may cause character errors for some TTY modems. In one embodiment, to prevent such problems, TTY modem detection system 400 may include a fast tone detector 407 to detect tone(s) indicative of the onset of TTY tone(s) in input signal 405. If fast tone detector 407 detects such tone(s), the notch filter 409 is enabled, which is disabled in its default mode of operation and is placed in the path of input signal 405 to voice mode switch 432. In one embodiment, notch filter 409 is a spectral notch filter for unobtrusively removing pre-detection TTY signal leakage from passing through signal processing 440 and packet network 450 to the remote TTY modem.

Figure 5:
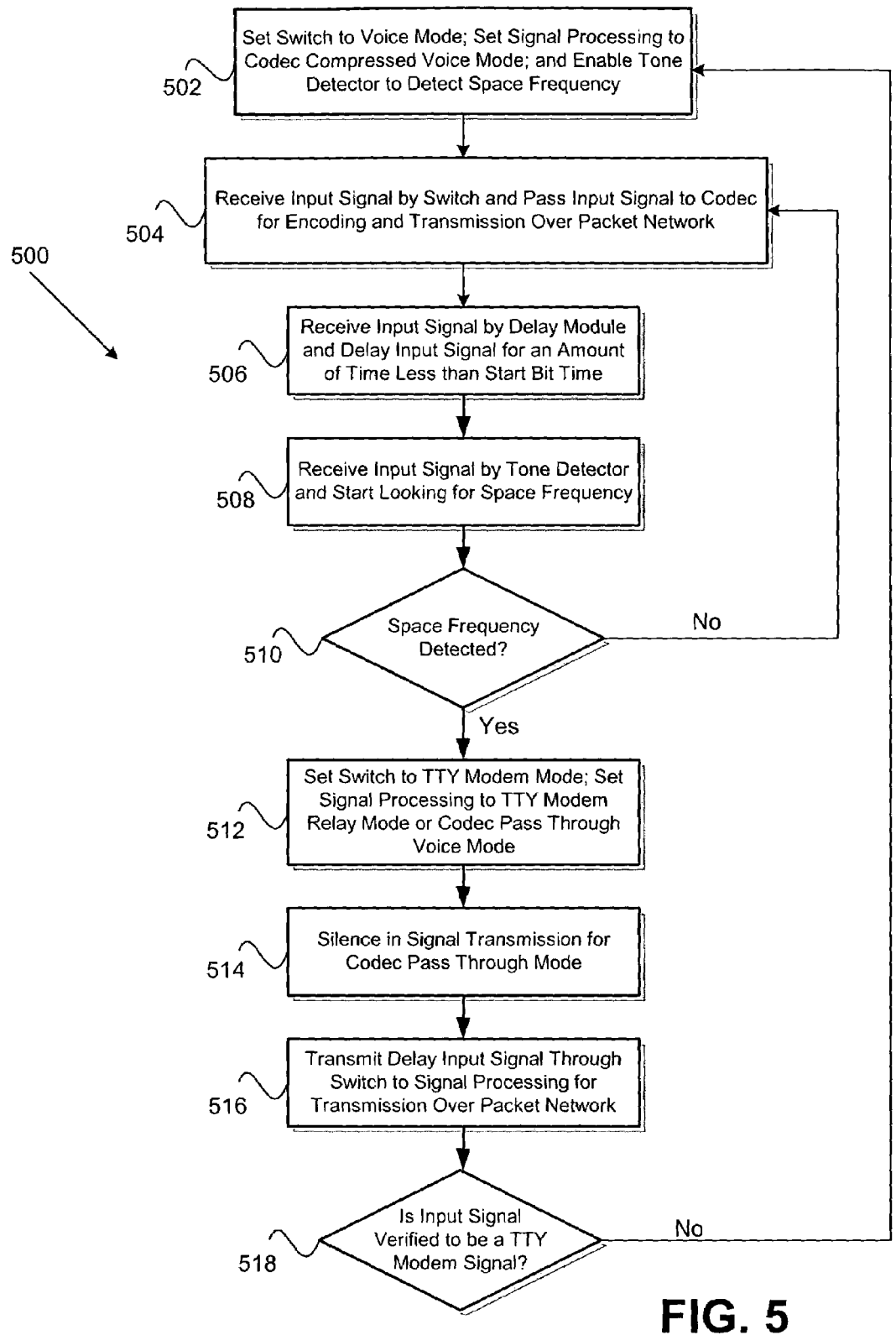
FIG. 5 illustrates an operation flow diagram for the TTY modem detection system of FIG. 4.

FIG. 5 illustrates operational flow diagram 500 for TTY modem detection system 400 of FIG. 4. Operational flow diagram 500 of FIG. 5 is described in conjunction with an embodiment of TTY modem detection system 400, which does not include fast tone detector 407 and notch filter 409 is not included in the path of input signal 405 to voice mode switch 432. As shown, in step 502, switch 430 is set to voice mode switch 432, signal processing 440 is set to codec 442 compressed voice mode, e.g. G.723.1, G.729, or the like coders, and tone detector 420 is enabled to detect space tone, e.g. 1800 Hz tone for U.S. TTY modems. Next, in step 504, switch 430 receives input signal 405 and directs input signal 405 through voice mode switch 432 to codec 442 of signal processing 440. Codec 442, which has been set to compressed voice mode as its default mode of operation, encodes input signal 405 from switch path 432 according to an encoding scheme, such as G.723.1, G.729, or the like coding schemes, and transmits encoded output signal 445 for transmission over packet network 450. Furthermore, at step 506, delay 410 receives input signal 405 simultaneously with step 504, and delays input signal 405 for less than start bit time, e.g. 22 ms. In one embodiment, delay 410 has a delay size of 20% to 25% of the start bit time, e.g. 4.4 ms to 5.5 ms. Yet, in another embodiment, delay 410 has a delay size of around 50% of the start bit time, e.g. 11 ms. Next, at step 508, tone detector 420 receives input signal 405 simultaneously with steps 504 and 506, and detects space frequency of the start bit for less than start bit time, e.g. 22 ms. In one embodiment, tone detector 420 may detect 20% to 25% of the start bit frequency, e.g. 4.4 ms to 5.5 ms of 1800 Hz space tone. Yet, in another embodiment, tone detector 420 may detect around 50% of the start bit frequency, e.g. 11 ms of 1800 Hz space tone.

In step 510, operational flow diagram 500 determines whether tone detector 420 has detected the space tone in step 508. If the space tone is not detected, operational flow diagram 500 reverts back to step 504. Otherwise, if tone detector 420 detects the space tone in step 508, then operational flow diagram 500 moves from step 510 to step 512. At step 512, tone detector 420 provides switch signal 425 to switch 430 and signal processing 440 and in response, switch 430 is switched from voice mode switch 432 to TTY modem switch 434, and signal processing 442 is either switched from codec 442 to TTY modem relay 444 or codec 442 selects a different coder, such as a G.711 coder to pass input signal 405 through in toll quality audio for transmission of TTY modem signals. The TTY modem mode includes the modem relay mode and/or the modem pass-through mode, which are described in the International Telecommunication Union (ITU) V.150.1 Standard, titled "Modem-over-IP networks: Procedures for the end-to-end connection of V-series DCEs"; and U.S. patent application Ser. No. 10/104,304, titled "Modem Relay Over A Packet Network", filed Mar. 22, 2002, which are hereby incorporated by reference.

Turning to FIG. 5, in step 514, if the TTY modem pass through mode is selected, a brief period of silence is transmitted over packet network 450. This silence that may be caused by a mode switch from one speech coder to another, and may further be extended for an additional time, ensures that a portion of the start bit or space tone transmitted as output signal 445 is interrupted to prevent a remote TTY modem from interpreting the transmitted portion of the start bit as the beginning of the start bit for the first character. The period of silence may be one bit time to one or two character time to prevent a false detection by a remote TTY modem. Next, in step 516, delayed signal 415 is transmitted to signal processing 440 through TTY modem switch 434 of switch 430 for transmission by signal processing 440 over packet network 450.

Figure 6:
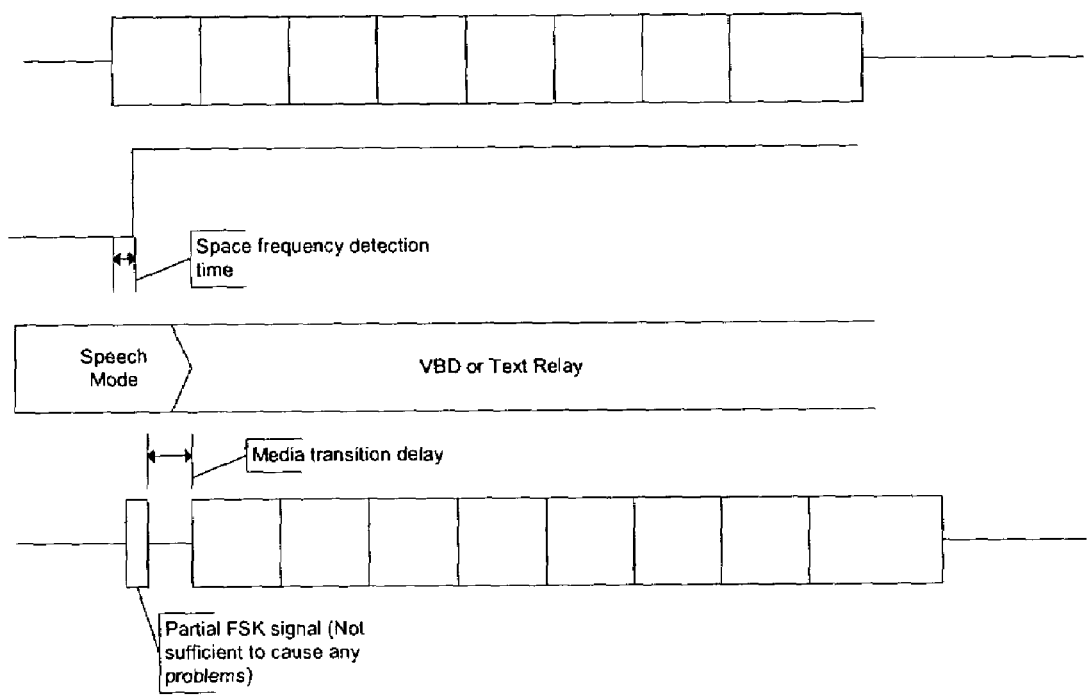
FIG. 6 illustrates a TTY modem signal transmission using the operation flow diagram of FIG. 5.

FIG. 6 shows TTY modem signal transmission of TTY modem detection system 400 using operational flow diagram 500. As shown the timing for space frequency detection 604 by tone detector 420, and mode switch 606, which is a result of the space tone detection in step 512. Further, FIG. 6 shows output signal 608, which includes a portion 609 of the space frequency 602, which was transmitted in the voice mode, followed by silence period 610, provided after switching from the voice mode to the TTY modem pass-through mode, which is then followed by input signal 602 from the delay line.

In the TTY modem pass-through mode, signal processing 440 encodes delayed signal 415 using a toll quality coder, such as a G.711 coder, to ensure that the remote TTY modem receives delayed signal 415 in a substantially intact form. In the TTY modem relay mode, however, signal processing 440 demodulates delayed signal 415 to generate a demodulated delayed signal, which can then be packetized and transmitted over packet network 450. Then, the packetized demodulated delayed signal is received by a remote gateway, depacketized, modulated according to TTY modem modulation scheme, e.g. FSK modulation, and transmitted to the remote TTY modem. As stated above, more detail about the TTY modem pass through mode and the TTY modem relay mode can be found in the ITU V.150.1 standard and the above-referenced patent application, which have been incorporated by reference into the present application.

In one embodiment of the present invention, operational flow diagram 500 may optionally include a verification step 518, where input signal 405 is confirmed to be a TTY modem signal. For example, if signal processing 440 is in TTY modem relay mode 444, input signal 405 is demodulated and determined whether the demodulated signal is a Baudot code. If the demodulated signal does not result in a Baudot code, operational flow diagram 500 reverts to step 502, where voice mode is selected. Similarly, if signal processing 440 is in TTY modem pass through mode, input signal 405 is monitored and determined whether a transition from space to mark is detected within at least 5 bit-time (i.e. assuming the longest case scenario that the first character is "00000"). If no transition from space to mark is detected within such period of time, operational flow diagram 500 reverts to step 502, where voice mode is selected.

It should be noted that in some embodiments, delay 405 can be eliminated and replaced with a tone generator that generates the space tone for a predetermined amount of time at step 516. Yet, in another embodiment, delay 410 may delay input signal to both voice mode switch 432 and TTY modem switch 434 and, in such event, step 514 can be eliminated. In a further embodiment, a portion or all of the delay may be incorporated within signal processing 440. In addition, although delay 410, tone detector 420 and switch 430 are shown outside of signal processing 440, in one embodiment, delay 410, tone detector 420 and switch 430 may be integrated in signal processing 440.

As stated above, TTY modem standards in other countries use different modulations and/or formats than in the U.S. However, TTY modem detection system 400 of FIG. 4 and operational flow diagram 500 of FIG. 5 remain applicable to such other standards, as exemplified below.

For example, European Deaf Telephone (or EDT), which is used in Germany, Austria, Switzerland, Malta, Spain and Italy, uses ITU-T V.21 Channel 1 modulation at a signaling rate of 110 bps. ITU-T V.21 Channel 1 modulation has a mark frequency at 980 Hz and a space frequency at 1080 Hz. In EDT, the mark frequency is transmitted for 300 ms before a character is transmitted, and the mark frequency is transmitted for up to one (1) second after the last character. EDT has a character format of one (1) start bit, seven (7) data bits, one (1) even parity bit and two (2) stop bits. The first EDT character can be detected using the present invention, as described below. For example, at step 506 of FIG. 5, the mark frequency that precedes the start bit is used for the detection of the first EDT character. At step 508, tone detector 420 starts looking for the mark frequency, i.e. 980 Hz, and at step 510, it is determined whether the 980 Hz mark frequency is detected for a pre-determined amount of time. In one embodiment, detection of 10-20 ms of the mark frequency can be sufficient at step 510.

As another example, ITU-T V.21 full-duplex is the TTY modem standard modulation and format in Denmark, Finland, Iceland, Norway, Sweden and the UK, which uses both Channels 1 and 2. Channel selection can be provided in several different ways. For instance, the DCE (Data Circuit-Terminating Equipment) starts in answer mode and then toggles at random intervals, e.g. 0.6-2.4 second intervals, between the calling and answer modes until a carrier connection is established. As a further example, the DCE uses stored information and chooses its mode of operation depending on whether the device has most recently dialed or detected a ring.

According to V.21, Channel 1 space frequency is 980 Hz and the mark frequency is 1180 Hz, and Channel 2 space frequency is 1650 Hz and the mark frequency is 1850 Hz. The data signaling rate is 300 bps, and typically a short (unspecified) preamble of mark frequency precedes a character. The character format is one (1) start bit, seven (7) data bits, one (1) even parity bit and one-two (1-2) stop bits. Since the gateway cannot distinguish between the calling side and the answering side, TTY modem detection system 400 may be modified to include two tone detectors for the two mark frequencies, and steps 508 and 510 of operational flow diagram 500 may be modified to detect either one of the mark frequencies, i.e. 1180 Hz and 1850 Hz. In one embodiment, detection of 10 ms of a mark frequency can be sufficient at step 510. In another embodiment, TTY modem detection system 400 may be modified to include four tone detectors for the two mark frequencies and the two space frequencies, and steps 508 and 510 of operational flow diagram 500 may be modified to detect either one of the mark frequencies and the space frequencies, i.e. 980 Hz, 1180 Hz, 1650 Hz and 1850 Hz. The four tone detector scheme provides a more reliable approach, since there is a possibility that no preamble is transmitted, and that a space tone may be transmitted for the start bit of the first character. In one embodiment, detection of 3 ms of a space frequency can be sufficient at step 510.

Bell 103 is also used by TTY modems in the U.S. Bell 103 uses FSK at a signaling rate of 300 bps or less. According to Bell 103, Channel 1 space frequency is 1070 Hz and the mark frequency is 1270 Hz, and Channel 2 space frequency is 2025 Hz and the mark frequency is 2225 Hz. Bell 103 scheme uses an answer tone of 2225 Hz. The character format is one (1) start bit, seven (7) data bits, one (1) even parity bit and one-two (1-2) stop bits. An approach similar to the one described in conjunction with V.21 full-duplex TTY modems can be applied for the detection of Bell 103 TTY modems.

In one embodiment of the present invention, a universal TTY modem detection system can be implemented by employing a plurality of tone detectors to detect TTY modems operating according to different standards. For example, the universal TTY modem detection system may look for the space frequency of Baudot TTY modems, and the mark frequency of the EDT TTY modems, etc., simultaneously, at step 508.

Figure 7:
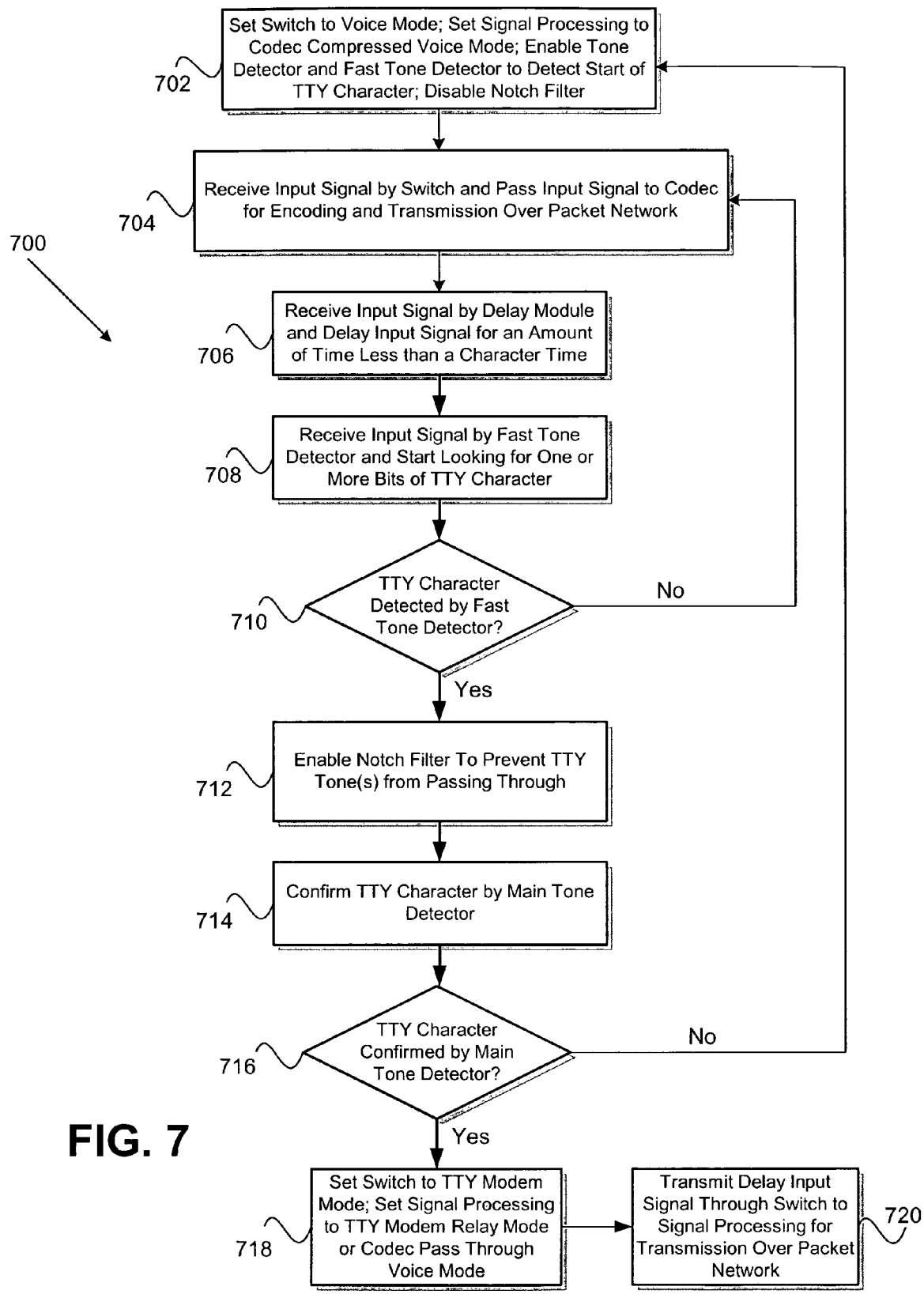
FIG. 7 illustrates another operation flow diagram for the TTY modem detection system of FIG. 4.

FIG. 7 illustrates operational flow diagram 700 for TTY modem detection system 400 of FIG. 4. Operational flow diagram 700 of FIG. 7 is described in conjunction with an embodiment of TTY modem detection system 400, which includes fast tone detector 407 and notch filter 409 transposed in the path of input signal 405 to voice mode switch 432. As shown, in step 702, switch 430 is set to voice mode switch 432, signal processing 440 is set to codec 442 compressed voice mode, e.g. G.723.1, G.729, or the like coders, notch filter 409 is disabled, and tone detector 420 and fast tone detector 407 are enabled to detect one or more bits of the first TTY character. In a preferred embodiment, fast tone detector is enabled to detect less number of bits of the TTY character than main tone detector 420. Next, in step 704, switch 430 receives input signal 405 and directs input signal 405 through voice mode switch 432 to codec 442 of signal processing 440. Codec 442, which has been set to compressed voice mode as its default mode of operation, encodes input signal 405 according to an encoding scheme, such as G.723.1, G.729, or the like coding schemes, and transmits encoded output signal 445 for transmission over packet network 450. Furthermore, at step 706, delay 410 receives input signal 405 simultaneously with step 504, and delays input signal 405 for less than a TTY character time, e.g. approximately 154 ms. Next, at step 708, fast tone detector 407 receives input signal 405 simultaneously with steps 704 and 706, and detects one or more bits of the first TTY character. For example, in one embodiment, fast tone detector 407 may detect the space frequency of the start bit or a portion thereof. In another embodiment, fast tone detector 407 may detect may detect the space frequency of the start bit and the following one or more bits, or any portion thereof, that can be space frequency or mark frequency.

In step 710, operational flow diagram 700 determines whether fast tone detector 407 has detected the beginning of the TTY character in step 708. If the beginning of the TTY character is not detected, operational flow diagram 700 reverts back to step 704. Otherwise, if fast tone detector 407 detects the beginning of the TTY character in step 708, then operational flow diagram 700 moves from step 710 to step 712. At step 712, notch filter 409 is enabled to filter out one or more tones, such as the space frequency and/or the mark frequency, from input signal 405 prior to reaching voice mode switch 432 to prevent a remote TTY modem from interpreting the transmitted portion of the input signal as the beginning of the first TTY character. In one embodiment, notch filter 409 is tuned to only remove the spectral content of the TTY modem signal so as to cause negligible degradation in speech quality at times when notch filter 409 is incorrectly enabled. It should be noted that in one embodiment, TTY modem detection system 400 may utilize a means other than notch filter 409 to prevent any portion of input signal 405 from being transmitted to the remote gateway. For example, a comfort noise period or a silence period may start at step 712. Next, at step 714, tone detector 420 receives input signal 405 simultaneously with steps 704, 706 and 708, and detects more bits of the first TTY character than fast tone detector 407. For example, in one embodiment, fast tone detector 407 may be configured to detect one or two bits of the first TTY character, whereas tone detector 420 may be configured to detect five or more bits of the first TTY character to avoid any false detection. At step 716, operational flow diagram 700 determines whether tone detector 420 has confirmed the beginning of the TTY character in step 714. If the beginning of the TTY character is not confirmed, operational flow diagram 700 reverts back to step 702. Otherwise, if tone detector 420 confirms the beginning of the TTY character in step 714, then operational flow diagram 700 moves from step 716 to step 718.

At step 718, tone detector 420 provides switch signal 425 to switch 430 and signal processing 440 and in response, switch 430 is switched from voice mode switch 432 to TTY modem switch 434, and signal processing 442 is either switched from codec 442 to TTY modem relay 444 or codec 442 selects a different coder, such as a G.711 coder to pass input signal 405 through in toll quality audio for transmission of TTY modem signals. Next, in step 720, delayed signal 415 is transmitted to signal processing 440 through TTY modem switch 434 of switch 430 for transmission by signal processing 440 over packet network 450. In one embodiment, prior to transmitting delayed signal 415, it is confirmed that notch filter 409 has operated on a sufficient amount of input signal 405, e.g. 4-5 bit time, to ensure that a false detection by the remote TTY modem is prevented. After step 720 (not shown), operational flow diagram 700 may utilize tone detector 420 to detect the end of TTY text, silence or voice to control switch 430 for switching from TTY modem switch 434 back to voice mode switch 432. It should be noted that although operational flow diagram 700 delays the text without the need to delay the voice through delay 410.

FIG. 8 shows TTY modem signal transmission of TTY modem detection system 400 using operational flow diagram 700, which, for example, is in pass-through mode. FIG. 8 shows the application of operational flow diagram 700 to input signal 405 and the resulting output signal 445, according to one embodiment, where fast tone detector 407 detects, for example, the start bit and the first bit (B1) of the TTY character, as shown in first region 810, before enabling notch filter 409 to prevent further transmission of input signal 405 over the packet network, as shown in second region 820. Further, main tone detector 420 continues detecting and confirms the TTY character after detecting, for example, the start bit and the first through fourth bits (B1-B4) of the TTY character, as shown in second region 820. Next, as shown in third region 810, input signal 405 buffered by delay 410 is transmitted over the packet network starting with the start bit. It should be noted that output signal 445 in first regions 810 and 820 is transmitted in the voice mode using a low quality voice coder, e.g. G.723.1, whereas output signal 445 in third region 830 is transmitted in modem mode using a toll quality voice coder, e.g. G.711 coder, or using modem relay. Further, second region 820 provides an interruption in the output signal 445 to prevent a remote modem to misinterpret output signal 445 in third region 830 as continuation of output signal 445 in first region.

From the above description of the invention it is manifest that various techniques can be used for implementing the concepts of the present invention without departing from its scope. Moreover, while the invention has been described with specific reference to certain embodiments, a person of ordinary skill in the art would recognize that changes can be made in form and detail without departing from the spirit and the scope of the invention. For example, it is contemplated that the circuitry disclosed herein can be implemented in software, or vice versa. The described embodiments are to be considered in all respects as illustrative and not restrictive. It should also be understood that the invention is not limited to the particular embodiments described herein, but is capable of many rearrangements, modifications, and substitutions without departing from the scope of the invention.

What is claimed is:

1. A text telephone modem detection method for use by a first gateway, said first gateway being capable of communicating with a second gateway over a packet network, said method comprising:

setting said first gateway to a voice mode having a first coding scheme;

encoding an input signal using said first coding scheme to generate a first encoded input signal, while said first gateway is in said voice mode;

transmitting said first encoded input signal to said second gateway over said packet network, while said first gateway is in said voice mode;

looking for a first tone in said input signal while said first gateway is in said voice mode, wherein said first tone is indicative of a beginning of a text telephone modem character, and wherein said text telephone modem character comprises said first tone;

detecting said first tone in said input signal while performing said looking;

setting said first gateway from said voice mode to a text telephone modem mode in response to said detecting;

providing a silence period, after a switching silence caused by said setting said first gateway from said voice mode to said text telephone modem mode, so as to prevent a detection of said first encoded input signal by said second gateway as said beginning of said text telephone modem character; and transmitting said input signal to said second gateway over said packet network, after said silence period, according to said text telephone modem mode.

2. The method of claim 1, wherein said text telephone modem mode has a second encoding scheme, and wherein the method further comprises:

encoding said input signal using said second coding scheme to generate a second encoded input signal, while said first gateway is in said text telephone modem mode; and transmitting said second encoded input signal to said second gateway over said packet network, while said first gateway is in said text telephone modem mode.

3. The method of claim 2 further comprising:

delaying said input signal in a delay line for a pre-determine period of time to generate a delayed input signal while said first gateway is in said voice mode;

transmitting said delayed input signal to said second gateway over said packet network according to said text telephone modem mode, prior to said transmitting said input signal to said second gateway over said packet network according to said text telephone modem mode.

4. The method of claim 3, wherein said delay line is less than a text telephone modem character bit time.

5. The method of claim 3, wherein said delay line is less than one half of a text telephone modem character bit time.

6. The method of claim 1, wherein said text telephone modem mode has a modem demodulator, wherein the method further comprises:

demodulating said input signal using said modem demodulator to generate a demodulated input signal, while said first gateway is in said text telephone modem mode; and transmitting said demodulated input signal to said second gateway over said packet network, while said first gateway is in said text telephone modem mode.

7. The method of claim 1 further comprising:

verifying said input signal is a modem signal after said setting said first gateway to said text telephone modem mode; and switching said first gateway to said voice mode if said verifying fails.

8. The method of claim 1, wherein said looking looks for said first tone and one or more additional tones in said input signal while said first gateway is in said voice mode, wherein each of said one or more additional tones is indicative of said beginning of said text telephone modem character, and wherein said detecting detects said first tone or said one or more tones in said input signal while performing said looking.

9. A first gateway capable of detecting a text telephone modem, said first gateway having a voice mode and a text telephone modem mode, said first gateway being capable of communicating with a second gateway over a packet network, said first gateway comprising:

an encoder configured to encode an input signal using a first coding scheme to generate a first encoded input signal, while said first gateway is in said voice mode;

a transmitter configured to transmit said first encoded input signal to said second gateway over said packet network, while said first gateway is in said voice mode;

a detector configured to look for a first tone in said input signal while said first gateway is in said voice mode, wherein said first tone is indicative of a beginning of a text telephone modem character, and wherein said text telephone modem character comprises said first tone;

wherein said detector is configured to detect said first tone in said input signal while looking for said first tone, wherein said first gateway is configured from said voice mode to said text telephone modem mode in response to detecting said first tone, wherein said first gateway is configured to provide a silence period, after a switching silence caused by said configuring said first gateway from said voice mode to said text telephone modem mode, so as to prevent a detection of said first encoded input signal by said second gateway as said beginning of said text telephone modem character; and wherein said transmitter is configured to transmit said input signal to said second gateway over said packet network, after said silence period, according to said text telephone modem mode.

10. The first gateway of claim 9, wherein said text telephone modem mode has a second encoding scheme, and wherein said encoder is configured to encode said input signal using said second coding scheme to generate a second encoded input signal, while said first gateway is in said text telephone modem mode, and wherein said transmitter is configured to transmit said second encoded input signal to said second gateway over said packet network, while said first gateway is in said text telephone modem mode.

11. The first gateway of claim 10 further comprising:

a delay line configured to delay said input signal for a pre-determine period of time to generate a delayed input signal while said first gateway is in said voice mode;

wherein said transmitter is further configured to transmit said delayed input signal to said second gateway over said packet network according to said text telephone modem mode, prior to said transmitting said input signal to said second gateway over said packet network according to said text telephone modem mode.

12. The first gateway of claim 11, wherein said delay line is less than a text telephone modem character bit time.

13. The first gateway of claim 11, wherein said delay line is less than one half of a text telephone modem character bit time.

14. The first gateway of claim 9 further comprising:

a modem demodulator;

wherein said modem demodulator is configured to demodulate said input signal to generate a demodulated input signal, while said first gateway is in said text telephone modem mode, and wherein said transmitter is further configured to transmit said demodulated input signal to said second gateway over said packet network, while said first gateway is in said text telephone modem mode.

15. The first gateway of claim 9, wherein said first gateway is configured to verify that said input signal is a modem signal after setting said first gateway to said text telephone modem mode, and wherein said first gateway is further configured to switch to said voice mode if said input signal is not verified to be a modem signal.

16. The first gateway of claim 9, wherein said detector is configured to look for said first tone and one or more additional tones in said input signal while said first gateway is in said voice mode, wherein each of said one or more additional tones is indicative of said beginning of said text telephone modem character, and wherein said detector is configured to detect said first tone or said one or more tones in said input signal while performing said looking.

* * * * *